United States Patent
Tuomi

(10) Patent No.: US 8,269,788 B2
(45) Date of Patent: Sep. 18, 2012

(54) VECTOR GRAPHICS ANTI-ALIASING

(75) Inventor: Mika Tuomi, Soormarkku (FI)

(73) Assignee: Advanced Micro Devices Inc., Sunnyvale, CA (US)

( * ) Notice: Subject to any disclaimer, the term of this patent is extended or adjusted under 35 U.S.C. 154(b) by 689 days.

(21) Appl. No.: 11/272,866

(22) Filed: Nov. 15, 2005

(65) Prior Publication Data

US 2007/0109318 A1 May 17, 2007

(51) Int. Cl.
*G09G 5/00* (2006.01)
(52) U.S. Cl. .................. 345/611; 345/613; 382/194
(58) Field of Classification Search .............. 345/611, 345/613; 382/194
See application file for complete search history.

(56) References Cited

U.S. PATENT DOCUMENTS

| | | | | |
|---|---|---|---|---|
| 4,554,538 A * | 11/1985 | Bieneman | .................. | 345/531 |
| 4,808,988 A * | 2/1989 | Burke et al. | .................. | 345/16 |
| 4,908,780 A * | 3/1990 | Priem et al. | .................. | 345/611 |
| 5,303,321 A * | 4/1994 | Peaslee et al. | .................. | 345/443 |
| 5,748,178 A | 5/1998 | Drewry | | |
| 5,815,162 A * | 9/1998 | Levine | .................. | 345/443 |
| 6,166,748 A | 12/2000 | Van Hook et al. | | |
| 6,411,290 B1 * | 6/2002 | Sasaki | .................. | 345/418 |
| 6,501,483 B1 * | 12/2002 | Wong et al. | .................. | 345/611 |
| 6,683,617 B1 * | 1/2004 | Naoi et al. | .................. | 345/613 |
| 6,967,663 B1 * | 11/2005 | Bastos et al. | .................. | 345/613 |
| 7,006,110 B2 * | 2/2006 | Crisu et al. | .................. | 345/626 |
| 7,064,771 B1 * | 6/2006 | Jouppi et al. | .................. | 345/614 |
| 2004/0227767 A1 | 11/2004 | Baroucelli et al. | | |
| 2005/0035976 A1 * | 2/2005 | Ecob et al. | .................. | 345/611 |
| 2006/0244748 A1 * | 11/2006 | Long et al. | .................. | 345/422 |
| 2007/0097145 A1 * | 5/2007 | Akenine-Moller | .......... | 345/611 |

FOREIGN PATENT DOCUMENTS

| | | |
|---|---|---|
| JP | 2003-271987 | 9/2003 |
| WO | WO 03/096275 | 11/2003 |
| WO | WO 2004/086307 | 10/2004 |
| WO | WO 2006/129943 | 12/2006 |

OTHER PUBLICATIONS

International Search Report, PCT/FI2006/000375, Date: Apr. 25, 2007.
Notice of Reasons for Rejection from the Japan Patent Office, dated Aug. 16, 2011 for Japanese Patent Application No. 2008-5394.
Daniel Rice; "Open VG Specification Version 1.0"; Sun Microsystems, Inc.; Jul. 28, 2005; pp. 1-178.
Michiel A. Klompenhouwer, et al.; "Subpixel Image Scaling for Color Matrix Displays"; Philips Research Laboratories; pp. 1-13.

(Continued)

*Primary Examiner* — Maurice L McDowell, Jr.
(74) *Attorney, Agent, or Firm* — Faegre Baker Daniels LLP

(57) ABSTRACT

A processor unit that can be used in a handheld device and configured for anti-aliasing of a vector graphics image, and including a counter value calculator configured to calculate, for one edge at a time and pixel-by-pixel, counter values for each pixel in a rasterization direction, a counter value recorder configured to store the calculated counter values in an edge buffer, and a pixel coverage value calculator configured to calculate pixel coverage values based on the stored counter values. The calculated pixel coverage values can be utilized for anti-aliasing the vector graphics image, while rasterizing the vector graphics image.

11 Claims, 4 Drawing Sheets

OTHER PUBLICATIONS

Norman P. Jouppi, et al.; "$Z^3$ An Economical Hardware Technique for High-Quality Antialiasing and Transparency"; Western Research Laboratory, Compaq Computer Corporation and Department of Computer Science, University of North Carolina.

R.D. Hersch; "Vertical Scan-Conversion for Filling Purposes"; Swiss Federal Institute of Technology, Lausanne.

Michael Herf; "Efficient Generation of Soft Shadow Textures" School of Computer Science Carnegie Mellon University; May 16, 1997; CMU-CS-97-138; pp. 1-31.

Stephanie Winner, et al.; "Hardware Accelerated Rendering of Antialiasing Using a Modified A-buffer Algorithm"; Apple Computer.

John S. Montrym, et al.; "InfiniteReality: Real-Time Graphics System"; Silicon Graphic Computer Systems.

Loren Carpenter; "The A-buffer, an Antialiased Hidden Surface Method"; Computer Graphics Project Computer Division Lucasfilm Ltd.; vol. 18, No. 3; Jul. 1984; pp. 103-108.

Andreas Schilling, "Exact: Algorithm and Hardware Architecture for an Improved A-Buffer"; Wolfgang Straber Universität Tubingen Bunderepublik Deutschland.

Edwin Catmull; "A Hidden-Surface Algorithm with Anti-Aliasing"; Computer Graphics Lab New York Institute of Technology; pp. 6-10.

Eliot A. Feibush, et al.; "Synthetic Texturing Using Digital Filters"; Program of Computer Graphics Cornell University; pp. 294-301.

Peter Shirley; "Discrepancy as a Quality Measure of Sample Distributions"; Department of Computer Science Indiana University; Proceedings of Eurographics 91; Jun. 1991; pp. 1-7.

Bryan D. Agkland; "The Edge Flag Algorithm—A Fill Method for Raster Scan Display"; IEEE Transactions on Computers; vol. C30; No. 1; Jan. 1981.

* cited by examiner

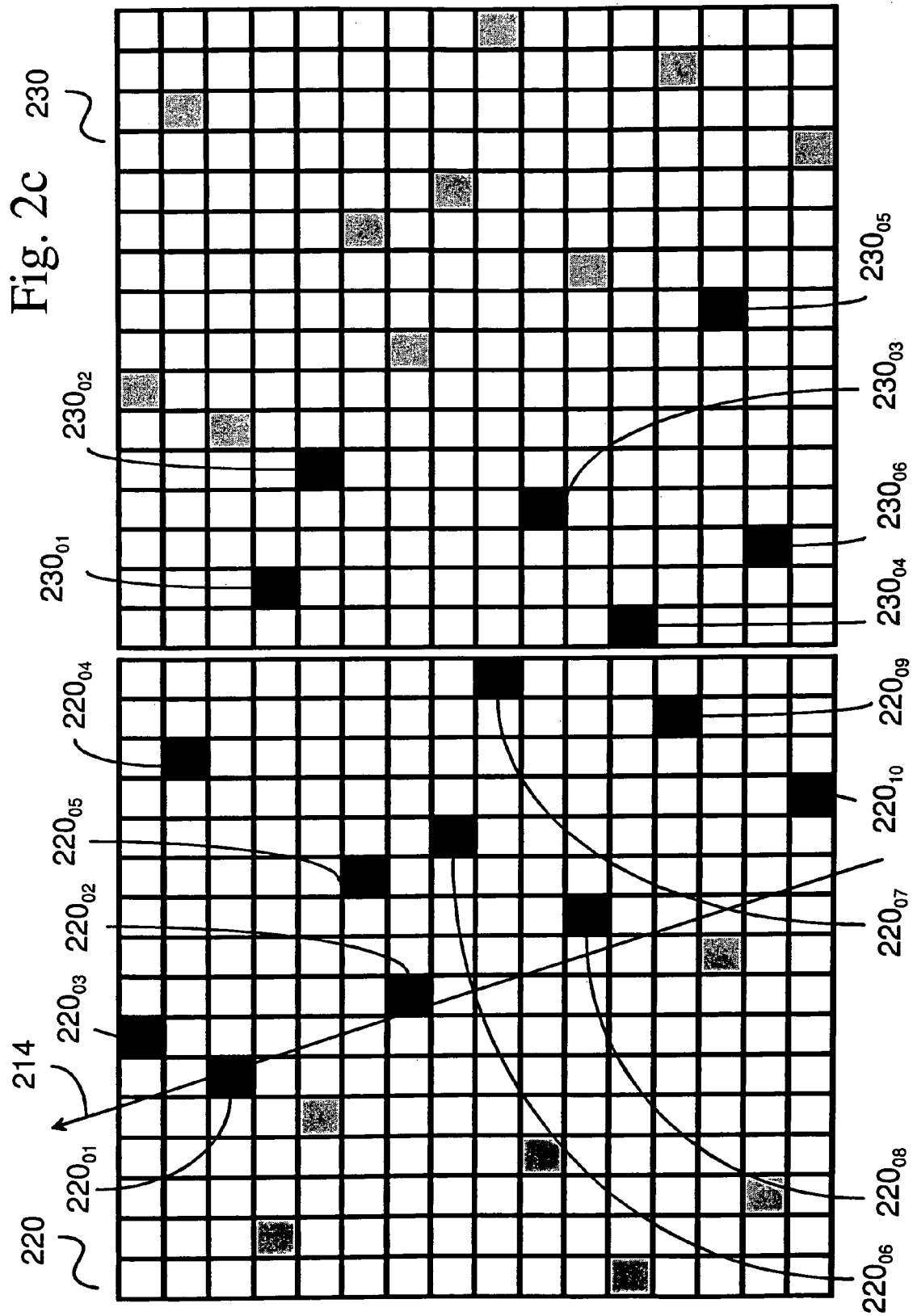

VECTOR GRAPHICS ANTI-ALIASING

CROSS REFERENCE TO RELATED DOCUMENTS

The present invention is related to concurrently filed U.S. patent application Ser. No. 11/272,867, entitled "BUFFER MANAGEMENT IN VECTOR GRAPHICS HARDWARE," the entire disclosure of which is hereby incorporated by reference herein.

BACKGROUND OF THE INVENTION

1. Field of the Invention

The present invention generally relates to vector graphics processing, and more particularly to anti-aliasing of a vector graphics image.

2. Discussion of the Background

In recent years, computer graphics have been employed for representing digital images, for example, as raster graphics, vector graphics, and the like. A raster graphics image can be stored and manipulated as a grid of pixels. Typically, the grid of pixels can be rectangular, having a horizontal dimension, and a vertical dimension. The raster graphics image can be displayed, for example, on a display device, such as a monitor, on media, such as paper, and the like. The color of each pixel can be individually defined. Typically, each pixel can be represented by independent values for the red, green, and blue components of the pixel. In addition, a value for a transparency component or "alpha" value can be included for each pixel of the graphics image. Accordingly, a raster graphics image can be determined by its resolution (e.g., the total number of pixels), and by its color depth (e.g., the amount of information in each pixel).

By contrast, a vector graphics image can include geometric objects, such as curves, lines, polygons, and the like. With a vector graphics image, rather than storing and manipulating each pixel of an image, information describing the geometric objects included in the image can be stored. For example, in the case of a geometric object, such as a circle, the stored information for drawing the circle can include the radius of the circle, the location of the center point of the circle, the style and color of the stroke line used for the circle, the style and color of the fill used for the circle, and the like.

Often, a geometric object can be decomposed into more simple geometric objects. For example, a quadrangle can be decomposed into two triangles. In the vector graphics arts, the term "primitive" can be used to refer to a basic or primitive element of a geometric object in a vector graphics image, and can include points, lines, planes, circles, spheres, triangles, polygons, and the like. When a primitive includes one or more line segments, these line segments can be referred to as "edges" in the vector graphics arts. For example, a quadrangle is a polygon consisting of four edges.

The advantages of vector graphics over raster graphics can include significantly smaller file size due to the minimal amount of information needed to be stored. In addition, the file size does not depend on the dimensions of the geometric object or objects included in the image. Furthermore, vector graphics can be used for describing both two-dimensional and three-dimensional geometric objects, and a vector graphics image can be scaled without losing its quality.

Even though a vector graphics image can be stored and modified in the above-described format, including the drawing information, the vector graphics image typically can be converted to a raster graphics image for display, and referred to as "rasterization." Typically, rasterization can include looping through each of the primitives, determining which pixels in the image a current primitive affects, and modifying the corresponding pixels accordingly.

While rasterizing a vector graphics image, "anti-aliasing" often can be employed to smooth the resulting raster graphics image, and can include manipulating the apparent smoothness of contours in the graphics image, for example, by manipulating the transparency of pixels neighboring such contours. Anti-aliasing commonly is employed in the art of computer graphics, particularly in the context of conventional computers, such as desktop computers, servers, and the like. For example, scalable fonts displayed on a computer screen can be anti-aliased, including determining for each pixel used to display a character, how much of that pixel is occupied by the character, and drawing that pixel with the corresponding degree of opacity. For example, when drawing a black character on a white background, if a pixel should ideally be half filled (e.g., such as by diagonal line from corner to corner), the pixel might be drawn with a 50% gray level.

In addition, various implementations of anti-aliasing for three-dimensional graphics have been developed. For example, a typical anti-aliasing solution for polygon-based three-dimensional rendering can include full-screen anti-aliasing in which a whole frame buffer is first rendered in a higher resolution and then sampled down. By using a suitable sampling scheme, the anti-aliasing can be achieved with a relatively low amount of samples and without sacrificing performance. However, this approach is not particularly suitable for two-dimensional rendering, because the requirements for anti-aliasing quality in two-dimensional rendering are higher. In other words, anti-aliasing in two-dimensional rendering would require a significantly larger amount of samples, resulting in a considerable penalty with regards to memory usage. Furthermore, such approach requires a special arrangement of samples in the output bitmap in order to achieve a suitable sampling pattern. Accordingly, two-dimensional anti-aliasing algorithms are typically used with bitmaps having a regular grid of samples for sample arrangement. Therefore, an anti-aliasing scheme used in connection with two-dimensional rendering should be able to operate with bitmaps having a regular grid of samples for sample arrangement.

Typically, texture data has already been filtered such that a higher sampling frequency need only be employed at polygon edges. Accordingly, some anti-aliasing techniques employ such an observation for calculating anti-aliasing only for polygon data, for example, by means of coverage masks where blending of color values fetched from different polygons is required only if the coverage masks define a partial fill area.

Schemes for two-dimensional polygon anti-aliasing algorithms can be classified into sample-based approaches, and analytical approaches. Sample-based approaches typically employ high-resolution data internally and calculate pixel intensities from such data. Generation of the high-resolution data can include rasterizing directly to a high-resolution buffer or using table lookup for edge masks that are used for composing the high-resolution buffer. Simply rendering at a higher resolution and then downscaling can be considered a simplified version of the sample-based approach. However, such sample-based approaches are relatively expensive with respect to bandwidth and memory usage, since a large amount of samples has to be processed.

Analytical approaches, on the other hand, attempt to calculate exact pixel coverage of a polygon by means of mathematical analysis. Analytical approaches can produce a higher amount of tones at polygon edges than sample-based approaches. Furthermore, analytical approaches do not suffer from sampling artifacts. However, analytical approaches are computationally expensive, for example, due to requiring clipping at pixel level and between polygons. In addition, even though sampling artifacts are avoided, there can be artifacts of other types, if optimizations are used in connection with analytical approaches. Furthermore, analytical approaches are not easily extendable for supporting various fill rules, and rather a polygon typically can be subdivided into smaller polygons or triangles, resulting in a time consuming step in the processing.

The above described anti-aliasing methods and algorithms typically are employed with high processing power computers, wherein powerful processors typically are required to implement such anti-aliasing techniques. With modern computers that are often equipped with a separate graphics processing unit in addition to a central processing unit, such techniques do not present a significant problem. However, with the rising popularity of various handheld devices, such as mobile telephones, personal digital assistants, handheld computers, and the like, which include a display for displaying graphics, but typically have processing power significantly lower than that of conventional computers, there is a need for an anti-aliasing scheme which provides a varied range of features and which is nevertheless efficient (e.g., not requiring a high-end platform), and simple to implement.

In addition, certain graphics standards have been developed, such the OpenVG 1.0 standard by Khronos group of Jul. 28, 2005, incorporated by reference herein, which provides an application programming interface (API) for hardware accelerated two-dimensional vector and raster graphics, including anti-aliasing. Accordingly, the OpenVG specification provides a set of device independent specifications to be implemented (e.g., by device manufacturers) in order to provide hardware acceleration on devices ranging from wristwatches to full microprocessor-based desktop and server machines. However, the OpenVG specification does not teach or suggest how to actually implement their specifications.

SUMMARY OF THE INVENTION

Therefore, there is a need to alleviate the problems described above. The above and other problems are addressed by the exemplary embodiments of the present invention, which provide high quality, mathematically correct, anti-aliasing of vector graphics images with sub-pixel accuracy, including support for concave, self-intersecting polygons with holes, support for even-odd winding fill rules and non-zero winding fill rules, and the like, and which is efficient enough to allow implementation on handheld devices with limited processing power, and the like. Accordingly, the exemplary embodiments can be employed with various graphical applications, including computer graphics applications, and the like, and in particular handheld device applications, low computing capacity device applications, memory limited device applications, and the like. Advantageously, the anti-aliasing solution of the exemplary embodiments is well suited for the corresponding hardware implementations, and the like.

Accordingly, in exemplary embodiments of the present invention there is provided a processor unit configured for anti-aliasing of a vector graphics image, including at least one primitive having at least one edge. The vector graphics image is rasterized into a group of pixels having a first dimension and a second dimension. The rasterization is performed in a rasterization direction which is parallel to the first dimension. There are multiple sub-pixel sampling points associated with each pixel, and a counter value is associated with each sub-pixel sampling point. The processor unit can include a counter value calculator configured to calculate the counter values for each pixel. The counter value calculation by the counter value calculator is performed pixel-by-pixel in the rasterization direction and for one edge at a time. The processor unit further includes a counter value recorder configured to store the calculated counter values in an edge buffer, and a pixel coverage value calculator configured to calculate pixel coverage values based on the stored counter values. The calculated pixel coverage values are utilized for anti-aliasing the vector graphics image, while rasterizing the vector graphics image into the group of pixels.

The exemplary embodiments further can include a device, such as a handheld device, and the like, and including a rasterizer configured to rasterize a vector graphics image, including at least one primitive having at least one edge, into a group of pixels having a first dimension and a second dimension. The rasterization is performed in a rasterization direction parallel to the first dimension, wherein multiple sub-pixel sampling points are associated with each pixel, and a counter value is associated with each sub-pixel sampling point. The handheld device further includes a processor unit configured to facilitate anti-aliasing of the vector graphics image, and including a counter value calculator configured to calculate the counter values for each pixel. The counter value calculation by the counter value calculator is performed pixel-by-pixel in the rasterization direction and for one edge at a time. The processor unit further includes a counter value recorder configured to store the calculated counter values in an edge buffer, and a pixel coverage value calculator configured to calculate pixel coverage values based on the stored counter values. The calculated pixel coverage values are utilized by the rasterizer for the anti-aliasing of the vector graphics image, while rasterizing the vector graphics image.

The exemplary embodiments further can include a processor unit for anti-aliasing of a vector graphics image, including at least one primitive having at least one edge. The vector graphics image is rasterized into a group of pixels having a first dimension and a second dimension. The rasterization is performed in a rasterization direction parallel to the first dimension, multiple sub-pixel sampling points are associated with each pixel, and a counter value is associated with each sub-pixel sampling point. The processor unit includes a counter value calculating means for calculating the counter values for each pixel. The counter value calculation by the counter value calculating means is performed pixel-by-pixel in the rasterization direction and for one edge at a time. The processor unit further includes a counter value recording means for storing the calculated counter values in an edge buffering means, and a pixel coverage value calculating means for calculating pixel coverage values based on the stored counter values. The calculated pixel coverage values are utilized for anti-aliasing the vector graphics image, while rasterizing the vector graphics image into the group of pixels.

The exemplary embodiments further can include a device, such as a handheld device, and the like, and including an edge buffering means, a rasterizing means for rasterizing a vector graphics image, including at least one primitive having at least one edge into a group of pixels having a first dimension and a second dimension. The rasterization is performed in a rasterization direction parallel to the first dimension, multiple sub-pixel sampling points are associated with each pixel, and a counter value is associated with each sub-pixel sampling point. The handheld device further includes a processor unit for anti-aliasing of the vector graphics image, and including a counter value calculating means for calculating the counter values for each pixel. The counter value calculation by the counter value calculating means is performed pixel-by-pixel in the rasterization direction and for one edge at a time. The processor unit further includes a counter value recording means for storing the calculated counter values in the edge buffering means, and a pixel coverage value calculating means for calculating pixel coverage values based on the stored counter values. The calculated pixel coverage values are utilized by the rasterizing means for the anti-aliasing of the vector graphics image, while rasterizing the vector graphics image.

In an exemplary embodiment, the counter value calculator is further configured to perform the counter value calculation by (i) incrementing a counter value associated with a current sub-pixel sampling point inside a current pixel, when the current sub-pixel sampling point intersects a current edge having a first vectorial direction, wherein the first vectorial direction is non-parallel with the rasterization direction; (ii) decrementing the counter value associated with the current sub-pixel sampling point inside the current pixel, when the current sub-pixel sampling point intersects a current edge having a second vectorial direction, wherein the second vectorial direction is non-parallel with the rasterization direction; (iii) incrementing the counter value associated with the current sub-pixel sampling point inside the current pixel, when the current sub-pixel sampling point is located, in the rasterization direction, behind the current edge having the first vectorial direction; (iv) decrementing the counter value associated with the current sub-pixel sampling point inside the current pixel, when the current sub-pixel sampling point is located, in the rasterization direction, behind the current edge having the second vectorial direction; (v) incrementing a counter value associated with another sub-pixel sampling point inside a pixel next to the current pixel in the rasterization direction, when the current sub-pixel sampling point is located, in the rasterization direction, before the current edge having the first vectorial direction, and when the current sub-pixel sampling point and the another sub-pixel sampling point are correspondingly positioned inside their respective pixels; and (vi) decrementing the counter value associated with the another sub-pixel sampling point inside the pixel next to the current pixel in the rasterization direction, when the current sub-pixel sampling point is located, in the rasterization direction, before the current edge having the second vectorial direction, and when the current sub-pixel sampling point and the another sub-pixel sampling point are correspondingly positioned inside their respective pixels.

In an exemplary embodiment, the counter value calculation by the counter value calculator is performed for one edge at a time. For example, counter values associated with sub-pixel sampling points affected by the current edge in the above manner inside all the pixels are incremented/decremented before moving on to increment/decrement counter values associated with sub-pixel sampling points affected by a subsequent edge, when the vector graphics image includes at least two edges in total.

In an exemplary embodiment, the pixel coverage value calculator is further configured to calculate the pixel coverage value of a current pixel by combining the stored counter values of each sub-pixel sampling point of the current pixel with the stored counter values of each sub-pixel sampling point of each preceding pixel in a current line of pixels. The pixel coverage value calculator is further configured to multiply an alpha value of the current pixel with the calculated pixel coverage value of the current pixel.

Advantageously, the exemplary embodiments allow anti-aliasing of vector graphics images in an efficient manner so as to allow implementation of the anti-aliasing on devices with limited processing power, such as handheld devices, including mobile telephones, personal digital assistants, handheld computers, and the like, and can be well suited for hardware implementations. In addition, the exemplary embodiments allow for high quality anti-aliasing of vector graphics images by supporting, for example, concave, self-intersecting polygons with holes, even-odd winding fill rules, non-zero winding fill rules, mathematically correct anti-aliasing with sub-pixel accuracy, and the like.

Still other aspects, features, and advantages of the present invention are readily apparent from the following detailed description, by illustrating a number of exemplary embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which:

FIG. 2c illustrates an exemplary counter value calculation for two consecutive pixels of the group of pixels of FIG. 2a, according to the exemplary embodiments of the present invention.

DETAILED DESCRIPTION OF THE PREFERRED EMBODIMENTS

Figure 1:
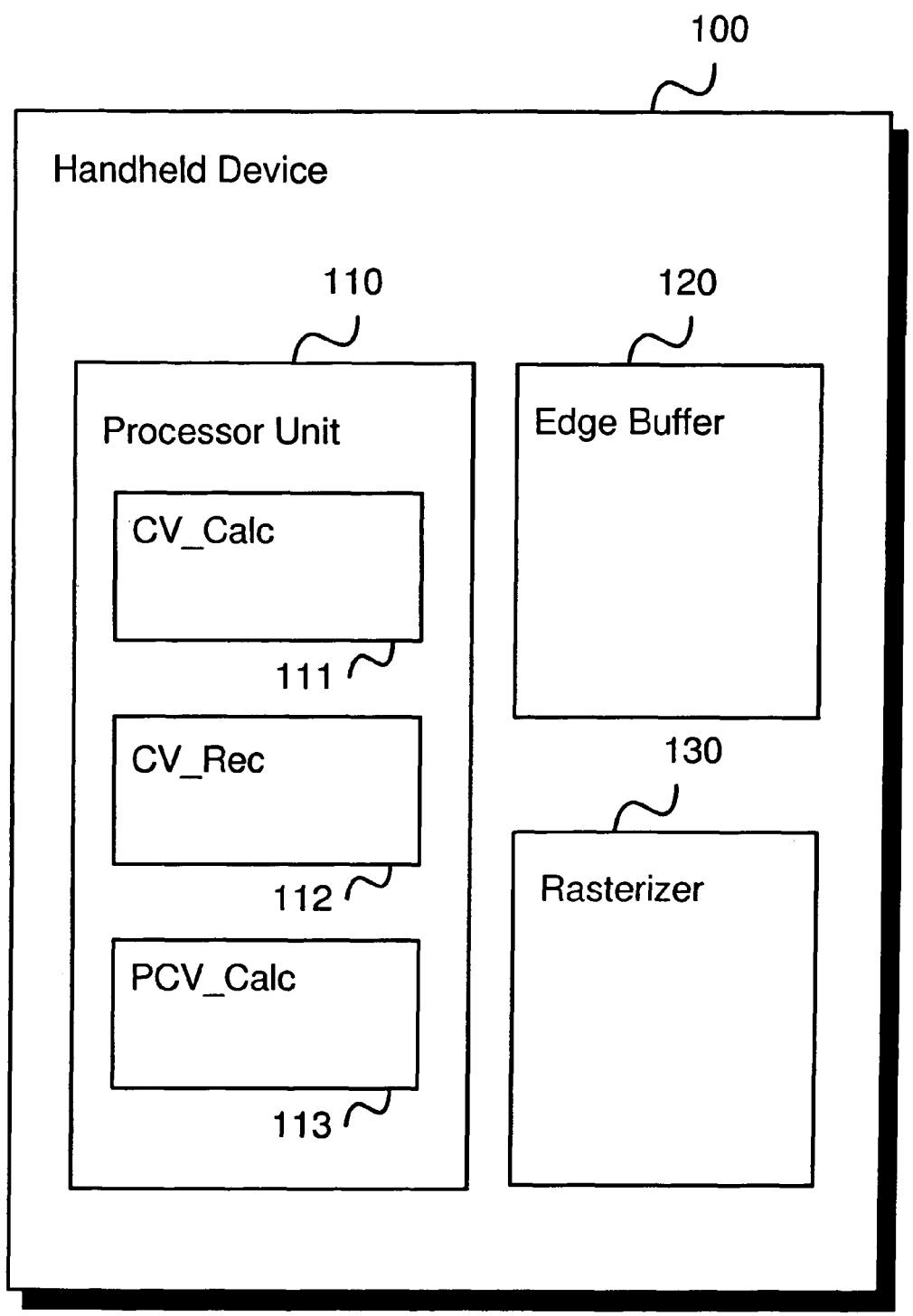
FIG. 1 is a block diagram illustrating an exemplary handheld device, according to the exemplary embodiments of the present invention.

Referring now to the drawings, wherein like reference numerals designate identical or corresponding parts throughout the several views, and more particularly to FIG. 1 thereof, there is illustrated an exemplary handheld device 100, according to exemplary embodiments. In FIG. 1, the handheld device 100 can include, for example, a mobile telephone, a personal digital assistant, a handheld computer, and the like. The handheld device 100 can include an edge buffer 120, including a portion of a memory set aside for the below described functions of the exemplary embodiments. The memory of which the edge buffer 120 is a portion of can include, for example, a memory circuit of the handheld device 100, a memory circuit of a graphics board (not shown) included in the handheld device 100, and the like, and which can be used for other functions. In further exemplary embodiments, the edge buffer 120 can be a portion of a memory dedicated for the performing only the functions of the exemplary embodiments.

The handheld device 100 can include a rasterizer 130 that can be configured to rasterize a vector graphics image into a group of pixels having a first dimension and a second dimension. The vector graphics image can include at least one primitive having at least one edge. In an exemplary embodiment, the rasterization can be performed in a rasterization direction, which is parallel to the first dimension, with multiple sub-pixel sampling points associated with each pixel, and with a counter value associated with each sub-pixel sampling point.

Figure 2A:
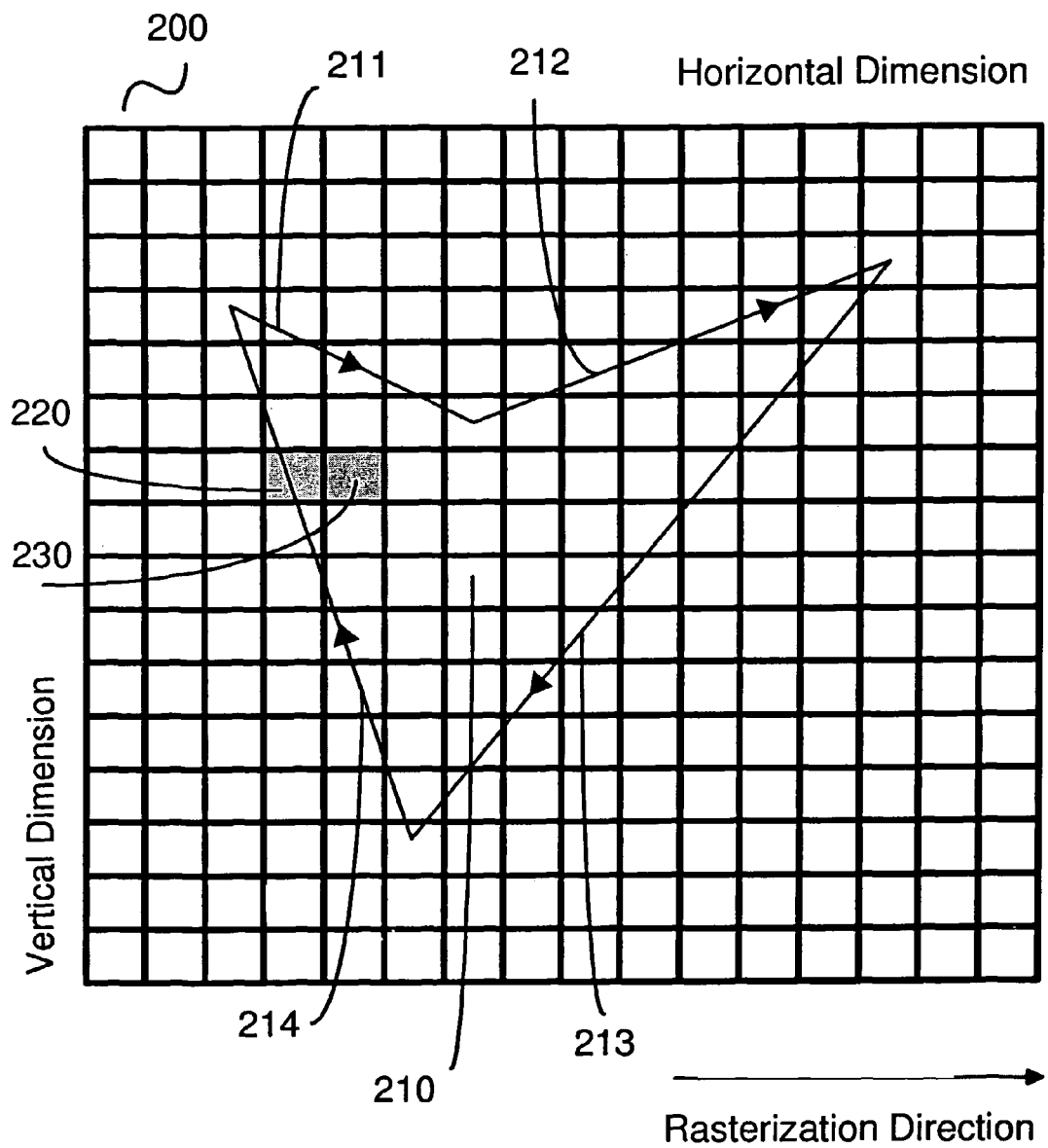
FIG. 2a illustrates an exemplary vector graphics image having one primitive and that can be rasterized and anti-aliased into a group of pixels by the exemplary embodiments of the present invention.

FIG. 2a illustrates an exemplary vector graphics image that can be rasterized by the rasterizer 130 of FIG. 1 into a group of pixels and that is to be anti-aliased while being rasterized, wherein the anti-aliasing can be facilitated by the processor unit 110 of FIG. 1. Although, for the sake of clarity, the vector graphics image illustrated in FIG. 2a is a simple graphics image only including one primitive 210, the exemplary embodiments can be applied to typical, real-life, vector graphics images including multiple primitives, as will be appreciated by those skilled in the graphics art(s). Accordingly, the primitive 210 is a simple polygon having four edges 211, 212, 213 and 214, and since, as the name implies, vector graphics is concerned with vectors, each of the edges 211, 212, 213 and 214 is a vector. As such, each of the edges 211, 212, 213 and 214 has an associated vectorial direction, as illustrated by the arrows in FIG. 2a. For the purposes of the exemplary embodiments, the vectorial directions associated with the edges 211, 212, 213 and 214 can be categorized into two main groups that are non-parallel with the first or horizontal dimension and that are essentially opposed to each other, and include an upward or first direction group, and a downward or second direction group. For example, the edges 211 and 213 belong to the downward direction group, and the edges 212 and 214 belong to the upward direction group.

According to the exemplary embodiments with respect to FIG. 2a, the polygon 210 can be rasterized into a raster graphics image 200, for example, which can include a group of 16×16 pixels. In other words, the raster graphics image 200 includes a rectangle having a first dimension or a horizontal dimension, and a second dimension or a vertical dimension. Accordingly, the raster graphics image 200 includes 16 pixels in the horizontal dimension, and 16 pixels in the vertical dimension. In further exemplary embodiments, however, the first and second dimension need not be of equal magnitude. In an exemplary embodiment, the polygon 210 can be rasterized into the raster graphics image 200 by processing each of the 16×16 pixels, one by one. For example, a first of row pixels can be processed from left to right, and then a next row of pixels can be processed, again from left to right, and this process can be repeated until all the rows of pixels have been processed. Accordingly, in the exemplary embodiments, the rasterization direction can be parallel to the horizontal dimension or from left to right, as illustrated in FIG. 2a.

As will be appreciated by those skilled in the graphics art(s), if no anti-aliasing is performed, the rasterization typically would result with pixels of the raster graphics image 200 intersecting the polygon 210 being drawn all in black (e.g., assuming that stroke color of the polygon 210 is black). However, with anti-aliasing, some of those pixels intersecting the polygon 210, as well as some of the neighboring pixels, can be drawn with various degrees of transparency or, effectively, in various shades of gray in case of black and white images, in order to provide the appearance of smooth contours. Advantageously, the exemplary embodiments allow determining of which pixels are to be drawn and in which degree of transparency, and in a way that is computationally efficient, thereby allowing anti-aliasing to be implemented even on devices with severely limited processing power, such as handheld devices, and the like.

Figure 2B:
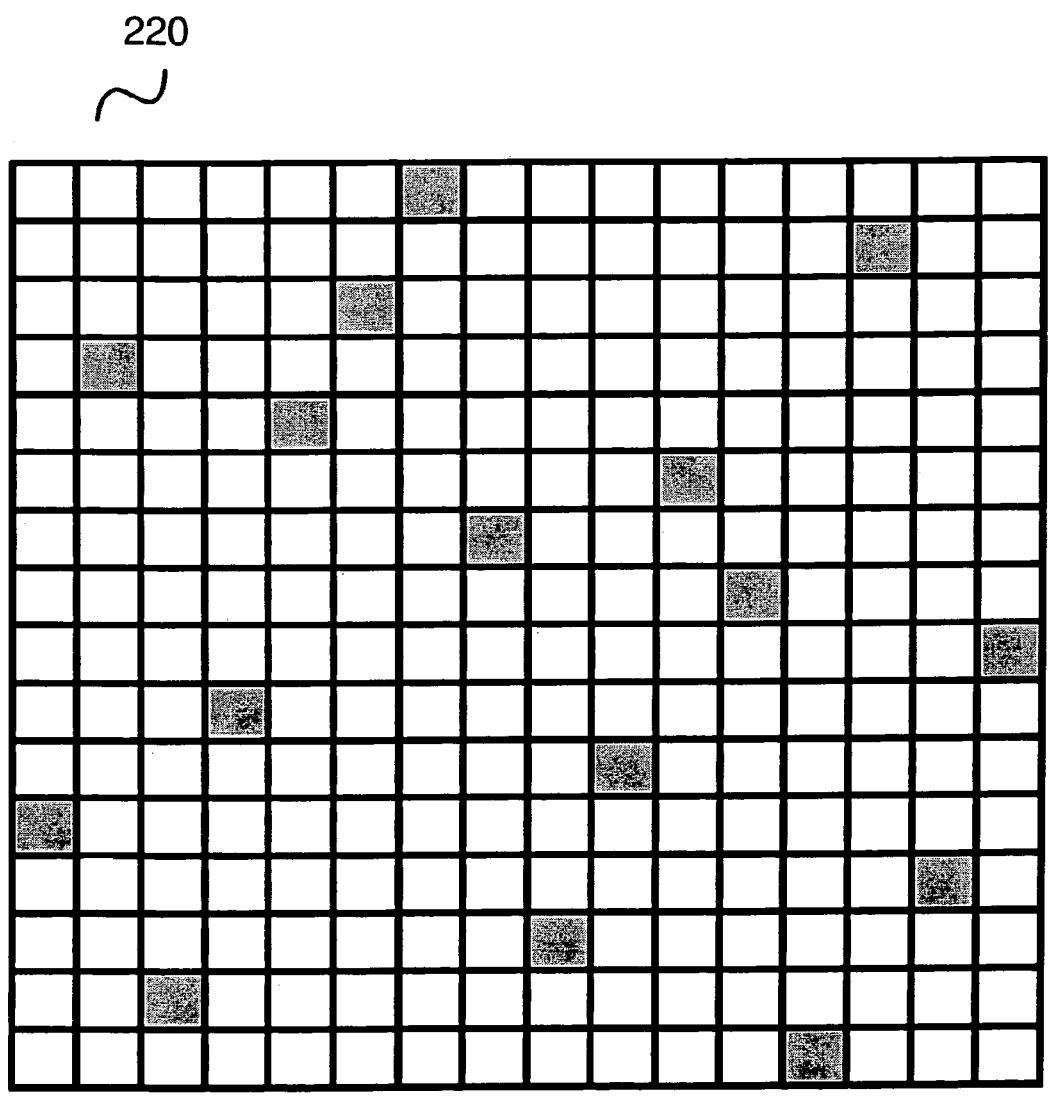
FIG. 2b illustrates an exemplary distribution of sampling points in one pixel of the group of pixels of FIG. 2a, according, to the exemplary embodiments of the present invention.

FIG. 2b illustrates an exemplary distribution of sampling points in the pixel 220 of the group of pixels of FIG. 2a, according to the exemplary embodiments. In an exemplary embodiment, the rest of the pixels of the group of pixels of FIG. 2a can employ a similar distribution of sampling points. As can be seen from FIG. 2b, the pixel 220 is split into 16×16 sub-pixels, wherein the gray filled sub-pixels indicate sub-pixel sampling points. In an exemplary embodiment, the sampling points can be distributed in a uniform manner, for example, including one sampling point per each horizontal sub-pixel row, one sampling point per each vertical sub-pixel row, and one sampling point per each diagonal sub-pixel line, as shown FIG. 2b. Accordingly, a total of 16 sampling points for the pixel 220 can be employed. In an exemplary embodiment, a counter value can be associated with each of the 16 sampling points. Each counter value can have a predetermined bit length (e.g., 8 bits or one byte). As further described, each counter value of each pixel can be stored in the edge buffer 120. Accordingly, since there can be 16×16 pixels, with each pixel having 16 associated counter values, and with each counter value having a length of one byte, the edge buffer 120 can be configured to store 16×16×16 bytes or 4096 bytes, according to an exemplary embodiment. However, in further exemplary embodiments other pixel grid sizes, other sub-pixel grid sizes, other sampling point distributions, other counter bit lengths, and the like, can be employed, as will be appreciated by those skilled in the graphics art(s).

The handheld device 100 of FIG. 1 further can include a processor unit 110 that can be configured to facilitate anti-aliasing of the vector graphics image, in accordance with the exemplary embodiments. In an exemplary embodiment, the processor unit 110 can form a part of a multi-purpose processor, for example, such as a central processing unit, a graphics processing unit, and the like, of the handheld device 100. In further exemplary embodiments, the processor unit 110 can be configured at least as part of an additional processor dedicated for performing the functions of the exemplary embodiments.

The processor unit 110 can include a counter value calculator 111 that can be configured to calculate the counter values for each pixel. In an exemplary embodiment, the counter value calculation can be performed for one edge at a time, and pixel-by-pixel, in the rasterization direction.

FIG. 2c illustrates an exemplary counter value calculation for the pixels 220 and 230 of the group of pixels of FIG. 2a, according to the exemplary embodiments. As shown in FIG. 2c, the upward edge 214 of the polygon 210 intersects the pixel 220, wherein the gray filled boxes indicate sub-pixel sampling points, and black filled boxes indicate sub-pixel sampling points having their associated counter values affected by the upward edge 214.

In an exemplary embodiment, the counter value calculator 111 can be configured to perform the counter value calculation by incrementing a counter value associated with a current sub-pixel sampling point inside a current pixel, when the current sub-pixel sampling point intersects a current edge having a first vectorial direction, wherein the first vectorial direction is non-parallel with the rasterization direction. For example, assuming the current pixel is the pixel 220 of FIGS. 2a-2c, the current edge is the edge 214, and the first vectorial direction is upward, sub-pixel sampling points $220_{01}$ and $220_{02}$ intersect the upward edge 214. As a result, the counter values associated with the sub-pixel sampling points $220_{01}$ and $220_{02}$ can be incremented. In an exemplary embodiment, a counter value can be set to an initial value of zero, and whenever the counter value is incremented or decremented, the counter can be incremented or decremented by one.

In an exemplary embodiment, the counter value calculator 111 can be further configured to perform the counter value calculation by decrementing the counter value associated with the current sub-pixel sampling point inside the current pixel, when the current sub-pixel sampling point intersects a current edge having a second vectorial direction, wherein the second vectorial direction is non-parallel with the rasterization direction. For example, assuming the current pixel is the pixel 220 of FIGS. 2a-2c, the current edge is the edge 214, and the second vectorial direction is downward, no counter values associated with any sub-pixel sampling points inside the pixel 220 are decremented, since there are no downward edges intersecting the pixel 220.

In an exemplary embodiment, the counter value calculator 111 can be further configured to perform the counter value calculation by incrementing the counter value associated with the current sub-pixel sampling point inside the current pixel, when the current sub-pixel sampling point is located, in the rasterization direction, behind the current edge having the first vectorial direction. For example, assuming the current pixel is the pixel 220 of FIGS. 2a-2c, the current edge is the edge 214, the first vectorial direction is upward, and the rasterization direction is from left to right, the counter values associated with the sub-pixel sampling points $220_{04}$, $220_{05}$, $220_{06}$, $220_{07}$, $220_{08}$, $220_{09}$ and $220_{10}$ are incremented, since the sub-pixel sampling points $220_{04}$, $220_{05}$, $220_{06}$, $220_{07}$, $220_{08}$, $220_{09}$ and $220_{10}$ are located to the right of the upward edge 214 (e.g., behind the upward edge 214 in the rasterization direction).

In an exemplary embodiment, the counter value calculator 111 can be further configured to perform the counter value calculation by decrementing the counter value associated with the current sub-pixel sampling point inside the current pixel, when the current sub-pixel sampling point is located, in the rasterization direction, behind the current edge having the second vectorial direction. For example, assuming the current pixel is the pixel 220 of FIGS. 2a-2c, the current edge is the edge 214, the second vectorial direction is downward, and the rasterization direction is from left to right, no counter values associated with any sub-pixel sampling points inside the pixel 220 are decremented, since there are no downward edges affecting the pixel 220.

In an exemplary embodiment, the counter value calculator 111 can be further configured to perform the counter value calculation by incrementing a counter value associated with another sub-pixel sampling point inside a pixel next to the current pixel in the rasterization direction, when the current sub-pixel sampling point is located, in the rasterization direction, before the current edge having the first vectorial direction, and when the current sub-pixel sampling point and the another sub-pixel sampling point are correspondingly positioned inside their respective pixels. For example, assuming the current pixel is the pixel 220 of FIGS. 2a-2c, the current edge is the edge 214, the first vectorial direction is upward, and the rasterization direction is from left to right, the counter values associated with the sub-pixel sampling points $230_{01}$, $230_{02}$, $230_{03}$, $230_{04}$, $230_{05}$ and $230_{06}$ are incremented, since the pixel 230 is the pixel next to the pixel 220 in the rasterization direction (e.g., to the right), and since the sub-pixel sampling points (e.g., the gray sampling points) of the pixel 220 spatially corresponding to the sub-pixel sampling points $230_{01}$, $230_{02}$, $230_{03}$, $230_{04}$, $230_{05}$ and $230_{06}$ are located to the left of the upward edge 214 (e.g., before the upward edge 214 in the rasterization direction).

In an exemplary embodiment, the counter value calculator 111 can be further configured to perform the counter value calculation by decrementing the counter value associated with the another sub-pixel sampling point inside the pixel next to the current pixel in the rasterization direction, when the current sub-pixel sampling point is located, in the rasterization direction, before the current edge having the second vectorial direction, and when the current sub-pixel sampling point and the another sub-pixel sampling point are correspondingly positioned inside their respective pixels. For example, assuming the current pixel is the pixel 220 of FIGS. 2a-2c, the current edge is the edge 214, the second vectorial direction is downward, and the rasterization direction is from left to right, no counter values associated with any sub-pixel sampling points inside the pixel 230 are decremented, since there are no downward edges affecting the pixel 220.

Although the above example include only one edge (e.g., the upward edge 214) affecting the counter values of the pixels 220 and 230, in more complex embodiments there may be several edges (e.g., possibly both upward and downward) affecting the counter values of a single pixel. Accordingly, in an exemplary embodiment, the effect of one edge on all the pixels and their counter values can be processed before moving on to process the effect of a next edge.

The processor unit 110 can further include a counter value recorder 112 that can be configured to store the calculated counter values in the edge buffer 120. The processor unit 110 can further include a pixel coverage value calculator 113 that can be configured to calculate pixel coverage values based on the stored counter values, wherein the calculated pixel coverage values can be utilized by the rasterizer 130 for the anti-aliasing of the vector graphics image, while rasterizing the vector graphics image.

In an exemplary embodiment, the pixel coverage value calculator 113 can be further configured to calculate the pixel coverage value of a current pixel by combining the stored counter values of each sub-pixel sampling point of the current pixel with the stored counter values of each sub-pixel sampling point of each preceding pixel in a current line of pixels. For example, to calculate the pixel coverage value for the pixel 220, the stored counter values of the sub-pixel sampling points of the three preceding pixels in the same horizontal pixel row (e.g., the seventh row from above) are combined with the stored counter values of the sub-pixel sampling points of the pixel 220. However, since no edges affect those three preceding pixels, the stored counter values of the sub-pixel sampling points of the three preceding pixels will be zero. As a result, the pixel coverage value for the pixel 220 can be the combination of the stored counter values of the sub-pixel sampling points of the pixel 220. In other words, the pixel coverage value for the pixel 220 can be set to $10/16$, since ten counter values out of the total sixteen counter values of the pixel 220 were incremented by one due to the upward edge 214, and since the remaining six counter values kept their initial value of zero.

Similarly, to calculate the pixel coverage value for the pixel 230, the stored counter values of the sub-pixel sampling points of the initial three pixels in the same horizontal pixel row, as well as those of the pixel 220, can be combined with the stored counter values of the sub-pixel sampling points of the pixel 230. Accordingly, the pixel coverage value for the pixel 230 can be the combination of the stored counter values of the sub-pixel sampling points of the pixels 220 and 230. In other words, the pixel coverage value for the pixel 230 can be set to $16/16$ or $10/16 + 6/16$, since six counter values out of the total sixteen counter values of the pixel 230 were incremented by one due to the upward edge 214, since the remaining ten counter values kept their initial value of zero, and since the above counter values of the sub-pixel sampling points of the pixel 220 can be combined with the counter values of the sub-pixel sampling points of the pixel 230.

In an exemplary embodiment, only the counter values of sub-pixel sampling points of pixels in a same horizontal pixel row can accumulate in the above described manner, wherein to facilitate such accumulation of the counter values, an auxiliary buffer (not shown) can be employed. Such an auxiliary buffer can include at least the same amount of auxiliary counter values as the amount of counter values of sub-pixel sampling points for one pixel or sixteen auxiliary counter values. The auxiliary buffer can be used as a temporary storage for the accumulated counter values of the preceding pixels in the current line of pixels, while calculating the pixel coverage value of the current pixel. Initially, the auxiliary counter values can be set to zero. Accordingly, continuing with the above example with respect to the pixels 220 and 230 at the seventh row of the raster image 200, the counter values of the sub-pixel sampling points for the pixel 220 can be stored in the edge buffer 120 and can be combined with the auxiliary counter values (e.g., initially zero) in the auxiliary buffer, resulting in the above pixel coverage value of $10/16$ for the pixel 220. Such a combination of the initial auxiliary counter values and the counter values of the sub-pixel sampling points for the pixel 220 can form the subsequent auxiliary counter values used for the next pixel 230. Accordingly, the counter values of the sub-pixel sampling points of the pixel 230 stored in the edge buffer 120 can be combined with the subsequent auxiliary counter values in the auxiliary buffer, resulting in the pixel coverage value of $16/16$ for the pixel 230.

In an exemplary embodiment, the pixel coverage value calculator 113 can be further configured to multiply an alpha value of the current pixel with the calculated pixel coverage value of the current pixel. As will be appreciated by those skilled in the graphics art(s), an alpha value is a ratio used to define transparency, typically such that an alpha value of 100% indicates a pixel that is completely opaque, an alpha value of 0% indicates a pixel that is completely transparent, and the alpha values in-between indicate a degree of transparency of a pixel. For example, assuming that the initial alpha values of all the pixels of the raster image 200 are 100%, the final alpha value of the pixel 220 will be $10/16 \times 100\% = 62.5\%$ (e.g., slightly transparent), and the final alpha value of the pixel 230 will be $16/16 \times 100\% = 100\%$ (e.g., completely opaque).

The exemplary embodiments can be included within any suitable device, for example, including any suitable servers, workstations,. PCs, laptop computers, PDAs, Internet appliances, handheld devices, cellular telephones, wireless devices, other devices, and the like, capable of performing the processes of the exemplary embodiments, and which can communicate via one or more interface mechanisms, including, for example, Internet access, telecommunications in any suitable form (e.g., voice, modem, and the like), wireless communications media, one or more wireless communications networks, cellular communications networks, G3 communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware art(s). For example, the functionality of one or more of the components of the exemplary embodiments can be implemented via one or more hardware devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be implemented by the preparation of application-specific integrated circuits or by interconnecting an appropriate network of conventional component circuits, as will be appreciated by those skilled in the electrical art(s).

As stated above, the components of the exemplary embodiments can include computer readable medium or memories according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

What is claimed is:

1. A processor unit for anti-aliasing of a vector graphics image including at least one primitive having at least one edge, wherein the vector graphics image is rasterized into a group of pixels having a first dimension and a second dimension, the rasterization is performed in a rasterization direction parallel to the first dimension, multiple sub-pixel sampling points are associated with each pixel, and a counter value is associated with each sub-pixel sampling point, the processor unit comprising:

a counter value calculator configured to calculate counter values for each pixel by one of incrementing and decrementing the counter values based on the positions in said first and second dimensions of the respective sub-pixel sampling points relative to said at least one edge, wherein the counter value calculation is performed for one edge at a time and pixel-by-pixel in the rasterization direction;

a counter value recorder configured to store the calculated counter values in an edge buffer; and a pixel coverage value calculator configured to calculate pixel coverage values based on the stored counter values, wherein the calculated pixel coverage values are utilized to produce an alpha value for a pixel for anti-aliasing the vector graphics image, while rasterizing the vector graphics image into the group of pixels, wherein the counter value calculator is further configured to perform the counter value calculation by:

one of incrementing and decrementing a counter value associated with a current sub-pixel sampling point inside a current pixel, when the current sub-pixel sampling point intersects a current edge having one of a first vectorial direction and a second vectorial direction, respectively, wherein the first and second vectorial directions are non-parallel with the rasterization direction;

one of incrementing and decrementing the counter value associated with the current sub-pixel sampling point inside the current pixel, when the current sub-pixel sampling point is located, in the rasterization direction, behind the current edge having one of the first vectorial direction and the second vectorial direction, respectively; and one of incrementing and decrementing a counter value associated with another sub-pixel sampling point inside a pixel next to the current pixel in the rasterization direction, when the current sub-pixel sampling point is located, in the rasterization direction, before the current edge having one of the first vectorial direction and the second vectorial direction, respectively, and when the current sub-pixel sampling point and the another sub-pixel sampling point are correspondingly positioned inside their respective pixels.

2. The processing unit of claim 1, wherein the calculated pixel coverage values are utilized for anti-aliasing the vector graphics image via manipulation of the transparency of pixels in the group of pixels, while rasterizing the vector graphics image into the group of pixels.

3. A processor unit for anti-aliasing of a vector graphics image including at least one primitive having at least one edge, wherein the vector graphics image is rasterized into a group of pixels having a first dimension and a second dimension, the rasterization is performed in a rasterization direction parallel to the first dimension, multiple sub-pixel sampling points are associated with each pixel, and a counter value is associated with each sub-pixel sampling point, the processor unit comprising:

a counter value calculator configured to calculate counter values for each pixel by one of incrementing and decrementing the counter values based on the positions in said first and second dimensions of the respective sub-pixel sampling points relative to said at least one edge, wherein the counter value calculation is performed for one edge at a time and pixel-by-pixel in the rasterization direction;

a counter value recorder configured to store the calculated counter values in an edge buffer; and a pixel coverage value calculator configured to calculate pixel coverage values based on the stored counter values, and configured to calculate the pixel coverage value of a current pixel by combining the stored counter values of each sub-pixel sampling point of the current pixel with the stored counter values of each sub-pixel sampling point of each preceding pixel in a current line of pixels;

wherein the calculated pixel coverage values are utilized to produce an alpha value for a pixel for anti-aliasing the vector graphics image, while rasterizing the vector graphics image into the group of pixels.

4. The processor unit of claim 3, wherein the pixel coverage value calculator is further configured to multiply an alpha value of the current pixel with the calculated pixel coverage value of the current pixel.

5. A graphical device, comprising:

an edge buffer;

a rasterizer configured to rasterize a vector graphics image including at least one primitive having at least one edge, wherein the vector graphics image is rasterized into a group of pixels having a first dimension and a second dimension, the rasterization is performed in a rasterization direction parallel to the first dimension, multiple sub-pixel sampling points are associated with each pixel, and a counter value is associated with each sub-pixel sampling point; and a processor unit configured for anti-aliasing of the vector graphics image, and including:

a counter value calculator configured to calculate the counter values for each pixel by one of incrementing and decrementing the counter values based on the positions in said first and second dimensions of the respective sub-pixel sampling points relative to said at least one edge, wherein the counter value calculation is performed for one edge at a time and pixel-by-pixel in the rasterization direction, a counter value recorder configured to store the calculated counter values in the edge buffer, and a pixel coverage value calculator configured to calculate pixel coverage values based on the stored counter values, wherein the calculated pixel coverage values are utilized to produce an alpha value for a pixel by the rasterizer for the anti-aliasing of the vector graphics image, while rasterizing the vector graphics image;

wherein the device comprises a mobile device.

6. The device of claim 5, wherein the counter value calculator is further configured to perform the counter value calculation by:

one of incrementing and decrementing a counter value associated with a current sub-pixel sampling point inside a current pixel, when the current sub-pixel sampling point intersects a current edge having one of a first vectorial direction and a second vectorial direction, respectively, wherein the first and second vectorial directions are non-parallel with the rasterization direction;

one of incrementing and decrementing the counter value associated with the current sub-pixel sampling point inside the current pixel, when the cur-rent sub-pixel sampling point is located, in the rasterization direction, behind the current edge having one of the first vectorial direction and the second vectorial direction, respectively; and one of incrementing and decrementing a counter value associated with another sub-pixel sampling point inside a pixel next to the current pixel in the rasterization direction, when the current sub-pixel sampling point is located, in the rasterization direction, before the current edge having one of the first vectorial direction and the second vectorial direction, respectively, and when the current sub-pixel sampling point and the another sub-pixel sampling point are correspondingly positioned inside their respective pixels.

7. The graphical device of claim 5, wherein the calculated pixel coverage values are utilized by the rasterizer for the anti-aliasing of the vector graphics image via manipulation of the transparency of pixels in the group of pixels, while rasterizing the vector graphics image.

8. A processor unit for anti-aliasing of a vector graphics image including at least one primitive having at least one edge, wherein the vector graphics image is rasterized into a group of pixels having a first dimension and a second dimension, the rasterization is performed in a rasterization direction parallel to the first dimension, multiple sub-pixel sampling points are associated with each pixel, and a counter value is associated with each sub-pixel sampling point, the processor unit comprising:
 a counter value calculating means for calculating the counter values for each pixel by one of incrementing and decrementing the counter values based on the positions in said first and second dimensions of the respective sub-pixel sampling points relative to said at least one edge, wherein the counter value calculation is performed for one edge at a time and pixel-by-pixel in the rasterization direction;
 a counter value recording means for storing the calculated counter values in an edge buffering means; and
 a pixel coverage value calculating means for calculating pixel coverage values based on the stored counter values,
 wherein the calculated pixel coverage values are utilized to produce an alpha value for a pixel for anti-aliasing the vector graphics image, while rasterizing the vector graphics image into the group of pixels;
 wherein the processor is operable to provide anti-aliasing of the vector graphics image for a mobile device.

9. The processor unit of claim 8, wherein the calculated pixel coverage values are utilized for anti-aliasing the vector graphics image via manipulation of the transparency of pixels in the group of pixels, while rasterizing the vector graphics image into the group of pixels.

10. A graphical device, comprising:
 an edge buffering means;
 a rasterizing means for rasterizing a vector graphics image including at least one primitive having at least one edge,
 wherein the vector graphics image is rasterized into a group of pixels having a first dimension and a second dimension,
 the rasterization is performed in a rasterization direction parallel to the first dimension,
 multiple sub-pixel sampling points are associated with each pixel, and
 a counter value is associated with each sub-pixel sampling point; and
 a processor unit for anti-aliasing of the vector graphics image, and including:
 a counter value calculating means for calculating the counter values for each pixel by one of incrementing and decrementing the counter values based on the positions in said first and second dimensions of the respective sub-pixel sampling points relative to said at least one edge, wherein the counter value calculation is performed for one edge at a time and pixel-by-pixel in the rasterization direction,
 a counter value recording means for storing the calculated counter values in the edge buffering means; and
 a pixel coverage value calculating means for calculating pixel coverage values based on the stored counter values,
 wherein the calculated pixel coverage values are utilized to produce an alpha value for a pixel by the rasterizing means for the anti-aliasing of the vector graphics image, while rasterizing the vector graphics image;
 wherein the device comprises a mobile device.

11. The graphical device of claim 10, wherein the calculated pixel coverage values are utilized by the rasterizing means for the anti-aliasing of the vector graphics image via manipulation of the transparency of pixels in the group of pixels, while rasterizing the vector graphics image.

\* \* \* \* \*